Patented Sept. 4, 1951

2,566,979

UNITED STATES PATENT OFFICE 2,566,979

PROCESS OF BREAKING WATER AND OIL EMULSIONS

Arthur E. Catanach and Ralph P. Gulley, Port Arthur, Tex., assignors to Gulf Oil Corporation, Pittsburgh, Pa., a corporation of Pennsylvania No Drawing. Application November 21, 1949, Serial No. 128,683

10 Claims. (Cl. 252—330)

This invention relates to a process for breaking oil and water emulsions and more particularly to a process for effecting a more speedy and more complete separation of oil and water emulsions of high salt content which occur in waste refinery waters.

Considerable attention has been focused on the problem of pollution of waterways by industrial concerns. Oil refineries are particularly concerned with this problem since a certain amount of waste oil may be discharged into these waterways along with the waste refinery water. Consequently, it is desired to remove as much of this oil as possible from the waste refinery waters before discharging them into these local waterways. It is also advantageous to recover this waste oil for reasons of economy. In large refineries the amount of waste oil may run into many thousands of gallons per month. This oil, if reclaimed, may be distilled into kerosene, fuel oil, and other commercially useful petroleum fractions. Consequently, in addition to the reasons relating to sanitation described above, a large economy may be effected by recovery of these waste oils.

Some of the sources from which the waste oils may arise are as follows:

(1) Oil rejected from various treating units or spilled in the refinery area;

(2) Bottom settlings and water, commonly referred to as BS and W, from crude oil tanks;

(3) Oil displaced from pipe lines during change-overs, spillage, leakage and the like;

(4) Tank cleaning operations; and (5) Oil present in waste treating reagents and cooling waters.

Many factors may contribute to producing extremely stable emulsions in waste refinery water, which emulsions can be broken by conventional processes only with difficulty or not at all. One well known condition which tends to produce stable emulsions is the presence of salt in the waste water. A high concentration of salt in the waste water is undesirable since it causes a "salting out" of the mud contained in said waste water. The mud which has been salted out combines with the oil present in the waste water to form a stable floating emulsion. Refinery cooling water often contains a large proportion of salt, particularly that water made use of in refineries which are located in coastal regions and which are affected by fluctuating tide levels or which are located downstream from other industrial plants.

In most oil-water emulsion breaking systems, whether chemical, mechanical or electrical, the refinery waste waters from the sources described above are gathered into numerous outdoor settling basins through an integrated system of sewers. The waste oil and water are allowed to settle in these basins until a rough separation has taken place. At this stage the liquid contained in these basins exists in an upper oil and oil-water emulsion layer and a lower aqueous layer. The upper layer of emulsion concentrate is then removed to a central waste disposal unit where it is subjected to an emulsion breaking procedure.

It has been known in one chemical emulsion breaking process to heat the emulsion and to add thereto spent caustic soda solution obtained from various refinery operations, whereby a separation of some degree occurs, at least in connection with the treatment of less stable emulsions. The use of spent refinery caustic is desirable not only from the standpoint of economy since it involves no additional cost but also from a standpoint of efficiency, since this spent caustic solution contains certain compounds extracted from the various petroleum fractions with which it has been in contact, which compounds appear to possess detergent qualities and which are useful in breaking oil-water emulsions. However, the use of ordinary spent refinery caustic solution is unsatisfactory in the case of stable emulsions such as those produced when the salt concentration of the waste refinery water approaches about 2,500 to about 25,000 P. P. M. or higher total chlorides expressed as NaCl. Due to the large salt concentrations in the waste water, the emulsions are either incompletely resolved or not broken at all by conventional processes employing ordinary untreated spent caustic solution. This increased salt concentration may be the result of low rainfall and evaporation, or, in coastal refineries may be the result of high tides, since under these conditions the salinity of the intake water approaches that of sea water (22,000 to 28,000 P. P. M. total chlorides expressed as NaCl). Under these circumstances it has been found that the oil-water emulsions formed in waste refinery water are too stable to be separated in the conventional manner.

One object of this invention is to provide a more rapid, more effective method for breaking stable, high salt content oil and water emulsions. Another object of the invention is to provide a process which will decrease the pollution of waterways. Another object is to provide a method which will effect a more complete separation of oil and water emulsions without substantially increasing the cost of the waste disposal treatment. Another object is to provide a process which will increase the yield of reclaimed oil which can be converted to commercial usage. Other objects will be obvious from the following description.

These objects are accomplished by our invention which comprises a process of breaking stable oil and water emulsions containing a relatively large proportion of inorganic salts, which process includes the steps of adding to the emulsion spent refinery caustic solution which has been pretreated by simultaneously blowing steam and air therethrough. The mixture thus formed is heated and agitated until the emulsion will break into separate oil and water phases after a short settling period, following which, heating and agitation are discontinued. The mixture is then allowed to settle into separate oil and water layers.

In the following description certain preferred embodiments of our invention are set forth. It is understood that these are by way of illustration only and not to be considered as limiting.

In carrying out our invention, high salt content emulsion concentrate is gathered from the settling basins described above and is conveyed to a central waste disposal unit. Following this step the pretreated spent caustic is added to the emulsion. The pretreated spent caustic solution is preferably added during agitation of the emulsion. The emulsion is then agitated and heated until the character of the mixture indicates that separate oil and water phases will break out quickly, when the mixture is allowed to settle.

In addition to reducing the viscosivity of the system, the heat applied to the emulsion also increases the speed of motion of the emulsified particles and consequently increases the number of collisions between these particles. Furthermore, the emulsion heating step produces an expansion of the emulsified particles, thus tending to break the protective film around the particles. These three effects combine to produce conditions most favorable to the breaking of the emulsion.

Heating and agitation of the mixture thus formed is then discontinued, following which the mixture is allowed to settle. The water layer is then drawn off, and the reclaimed oil is pumped to storage. The next batch of emulsion is then charged, and the steps of the process are repeated. The pretreatment of the spent refinery caustic solution is accomplished by blowing steam and air therethrough for a period of several hours.

In a preferred modification of our invention the emulsion obtained from the settling ponds and containing approximately 2,500 P. P. M. salt or higher is preheated to about 200° F. by means of steam and air. The air is blown through the mixture and serves to agitate the emulsion. The steam may be passed through coils immersed in the emulsion or actually bubbled through the liquid mixture. Spent caustic solution having a gravity ranging from about 8° Bé. to 10° Bé. is pretreated by simultaneously blowing steam and air therethrough at a temperature of about 200° F. for a period of five hours. The pretreated spent caustic soda solution is then added to the heated emulsion in a proportion of about 2 to 10 per cent by volume, and heating and agitation of the mixture is then continued for about 30 minutes or longer. Heating and agitation of the mixture is then discontinued, and the liquid mixture is allowed to settle into separate oil and water layers. Following this step water is drawn off and the oil layer is pumped to storage. The agitator is then refilled with emulsion and the process is repeated.

The following illustrative examples will point out more clearly the merit of our invention.

EXAMPLE I

In each of the two plant scale experiments carried out, the data for which are listed in the table below, the following procedure was employed:

The emulsion to be broken was heated to about 200° F., and untreated spent refinery caustic solution was added thereto, while the emulsion was agitated. The mixture thus produced was further heated and agitated for about 30 minutes, following which the mixture was allowed to settle. The results obtained are illustrated in the table below.

Table A

|  | Untreated Spent Caustic Soda Solution | |
|---|---|---|
|  | Run 1 | Run 2 |
| Water-Oil Emulsion Chg., Bbls | 4,000 | 4,000 |
| Spent Caustic Added, Bbls | 100 | 100 |
| °Bé. of Caustic | 8 | 8 |
| Total Charge, Bbls | 4,100 | 4,100 |
| Yield, Bbls.: |  |  |
| Oil | 664 | 0 |
| Middle Layer Emulsion | 430 | 349 |
| Water | 3,006 | 3,751 |
| pH of Water | 9.0 | 9.0 |
| Salt Content, P. P. M | 6,000 | 2,700 |

EXAMPLE II

In each of the plant scale runs carried out, the results for which are listed in Table B below, the same procedure described above in connection with Example I was followed, except that pretreated spent caustic solution was employed. The pretreatment was carried out by steam and air stripping for about five hours at about 200° F. The table below indicates the results obtained.

Table B

|  | Pretreated or Conditioned Caustic Soda Solution | | |
|---|---|---|---|
|  | Run 1 | Run 2 | Run 3 |
| Water-Oil Emulsion Chg., Bbls | 4,000 | 4,000 | 4,000 |
| Spent Caustic Added, Bbls | 100 | 100 | 100 |
| °Bé. of Caustic | 8 | 8 | 8 |
| Total Charge, Bbls | 4,100 | 4,100 | 4,100 |
| Yield, Bbls.: |  |  |  |
| Oil | 1,495 | 1,577 | 166 |
| Middle Layer Emulsion | 0 | 0 | 0 |
| Water | 2,605 | 2,523 | 3,934 |
| pH of Water | 9.0 | 10.0 | 9.0 |
| Salt Content, P. P. M | 5,400 | 5,500 | 6,500 |

It will be noted that prior art processes, illustrated by the runs carried out in Example I, do not effect a complete separation, since in each of the runs a substantial middle layer emulsion still existed after completion of the treatment. This may be compared with the results obtained in Example II, wherein pretreated spent caustic solution was employed, and wherein a complete separation occurred, as evidenced by the complete lack of a middle layer of emulsion after the process was completed. It should also be noted that the prior art process failed to completely resolve the water-oil emulsion even when the salt content of the water contained in the emulsion fell to 2700 P. P. M.

The emulsion to be broken may be agitated and heated or not, as desired, prior to the addition of the pretreated spent caustic. However, preheating is preferably employed. Where the emulsion is preheated prior to the addition of the pretreated spent caustic solution, this preliminary heating may be carried out at temperatures other than those described in the foregoing description. As stated above, the principal functions of the heating step are to reduce the viscosity of the system, to increase the speed of motion of the emulsified particles and the consequent number of collisions thereof, and to cause an expansion of the emulsified particles. Consequently, a higher or lower temperature may be used, depending upon the degree of stability of the particular emulsion being treated. Usually, from about 150° F. to 210° F. is preferred, with about 200° F. being particularly preferred. However, lower temperatures may be used but with a corresponding decrease in the speed and perhaps the completeness of the emulsion breaking process. As indicated hereinbefore the pretreated spent caustic may be added while the emulsion is at room temperature, if desired, but greatly superior results are obtained when the emulsion is preheated to a temperature within the preferred range prior to the addition thereto. Temperatures above about 212° F. are not recommended where the heating is carried out in open vessels, since excessive foaming results. However, when the heating is carried out under pressure, higher temperatures may be employed. In general, the increased expense and difficulty involved in the use of high temperatures are not justified by the improvement in the results.

The sole purpose of the air in the preliminary heating of the emulsion is to agitate the liquid mixture. It will appear obvious to one skilled in the art that other means of agitation may be employed with equal success. Where preheating of the emulsion is employed, agitation is preferably begun prior to the addition of the pretreated spent caustic and is continued along with heating until the settling period is reached. Where no preheating step is employed, the agitation is preferably begun no later than during the final heating.

The spent caustic soda solution employed in our invention is obtained from various operations in the refinery and results primarily from the use of caustic soda solution for the removal or reduction of hydrogen sulfide, mercaptans, and possibly certain other compounds from gasoline, kerosene, naphtha, gases and other light products. It should be noted that spent "doctor" solution is not operative in this process since the lead sulfide in spent "doctor" solution would actually inhibit the breaking of the emulsion. The fresh caustic used in washing gasoline and the other fractions listed above usually has a gravity ranging from about 5° Bé. to about 20° Bé. The concentration of the over-all spent caustic solution obtained from all sources prior to pretreating is usually such that the solution has a gravity of about 8° to 10° Bé. Spent caustic solution of this concentration is preferred in the carrying out of the invention. The pretreated spent caustic is preferably added to the emulsion in the amount of about 2–10 per cent by volume. It often occurs that the gravity of the spent caustic solution obtained from the several sources listed above is substantially lower than 8° Bé. Where possible, it is preferred to blend the spent caustic solution having a gravity of below 8° Bé. with a suitable quantity of spent caustic soda solution which has a gravity of above 10° Bé. until a mixture is produced which has a gravity within the preferred range of 8° to 10° Bé. However, in situations where utmost speed is desired, or when the more concentrated spent caustic solution is unavailable, spent caustic soda solution having a gravity of as low as 2° to 3° Bé. may be used successfully. In such instances a proportionately larger quantity of spent caustic soda solution is required.

The pretreating of the spent caustic soda solution also may be carried out at temperatures other than those described in the foregoing description. This temperature may vary between about 160° and 235° F. or higher, with temperatures below about 225° F. being particularly preferred, since higher temperatures require pressure heating. The time of pretreatment may also be varied but in most cases should be at least about three hours, with about five hours being particularly preferred. The steam is preferably blown through the caustic soda solution along with the air in a ratio varying about 1 to 10 volumes of steam per volume of air.

After the pretreated spent caustic soda solution is added to the emulsion, the mixture is heated and agitated until the emulsion will break into separate phases after a short settling period. An experienced operator can determine this by a change in the appearance of the mixture. The inexperienced operator, unfamiliar with this appearance change, may take samples of the mixture at various time intervals after all of the caustic soda solution has been added and ascertain when the heating and agitation should be stopped by observing the rate of settling of the separate oil and water phases in the sample containers. Where the emulsion has been preheated before addition of the preconditioned spent caustic solution, as is preferred, agitation and heating are continued, the temperature being maintained between the limits described previously in connection with the preheating step. Where no preheating step is employed, heating is begun after addition of the preconditioned spent caustic solution is complete, the temperature again corresponding to those described in connection with the preheating step. Normally a heating period of about thirty minutes is sufficient to accomplish the desired results. In certain instances, however, heating for as long as 1½ hours may be necessary, depending on the concentration of the spent caustic solution, the stability of the emulsion to be broken and the thoroughness of the pretreating process of the spent caustic soda solution.

After the emulsion and spent caustic mixture has been heated and agitated for the period of time described above, heating and agitation thereof is discontinued and the mixture is allowed to separate into separate oil and water phases. The separation is easily recognized, since the mixture forms two distinct layers. The settling time may run from about thirty minutes to six hours, with no more than about two hours being sufficient in most cases.

One advantage of our invention is that it provides a method whereby pollution of waterways may be substantially decreased. Another advantage produced by our process is that a substantially larger amount of waste oil may be reclaimed, which reclaimed oil may be converted to commercially desirable products. A further advantage of our process is that a more rapid and more complete separation of oil and water emulsions is produced without substantially increasing the cost. A still further advantage of our process is that it provides a complete separation of extremely stable high salt content water-oil emulsions.

By the term "spent caustic solution" employed in the foregoing description and in the appended claims, we mean to include either slightly spent or up to 95 per cent spent caustic solution, as long as the solution in question has a gravity above about 2° Bé. This terminology is in conformity with that usually employed by the art since caustic solution, which is "spent" as far as refinery operations are concerned, is not neutral but still possesses considerable alkalinity.

What we claim is:

1. The process of breaking stable oil-water emulsions containing a relatively large proportion of inorganic salts, said process comprising adding thereto spent refinery caustic solution which has been pretreated by simultaneously blowing steam and air therethrough for several hours at a temperature of above about 160° F., agitating and heating the mixture thus formed until the emulsion will break into separate oil and water phases after a short settling period, discontinuing agitation and heating, and allowing the mixture to settle into separate oil and water layers.

2. The process of breaking stable oil-water emulsions containing a relatively large proportion of inorganic salts, said process comprising heating and agitating the emulsion, adding thereto spent refinery caustic solution which has been pretreated by simultaneously blowing steam and air therethrough for several hours at a temperature of above about 160° F., continuing to agitate and heat the mixture thus formed until the emulsion will break into separate oil and water phases after a short settling period, discontinuing agitation and heating, and allowing the mixture to settle into separate oil and water layers.

3. The process of breaking stable oil-water emulsions containing a relatively large proportion of inorganic salts, said process comprising heating and agitating the emulsion until a temperature of about 150° F.–210° F. is reached, adding thereto spent refinery caustic solution which has been pretreated by simultaneously blowing steam and air therethrough for several hours at a temperature of above about 160° F., continuing to agitate and heat the mixture thus formed until the emulsion will break into separate oil and water phases after a short settling period, discontinuing agitation and heating, and allowing the mixture to settle into separate oil and water layers.

4. The process of breaking stable oil-water emulsions containing a relatively large proportion of inorganic salts, said process comprising heating and agitating the emulsion, adding thereto at least about 2 per cent by volume of a spent refinery caustic solution which has been pretreated by simultaneously blowing steam and air therethrough for several hours at a temperature of above about 160° F., continuing to agitate and heat the mixture thus formed until the emulsion will break into separate oil and water phases after a short settling period, discontinuing agitation and heating, and allowing the mixture to settle into separate oil and water layers.

5. The process of breaking stable oil-water emulsions containing a relatively large proportion of inorganic salts, said process comprising heating and agitating the emulsion, adding thereto spent refinery caustic solution which has been pretreated by simultaneously blowing steam and air therethrough at a temperature of above about 160° F. for at least about three hours, continuing to agitate and heat the mixture thus formed until the emulsion will break into separate oil and water phases after a short settling period, discontinuing agitation and heating, and allowing the mixture to settle into separate oil and water layers.

6. The process of breaking stable oil-water emulsions containing a relatively large proportion of inorganic salts, said process comprising heating and agitating the emulsion, adding thereto spent refinery caustic solution which has been pretreated by simultaneously blowing steam and air therethrough for several hours at a temperature of above about 160° F., continuing to agitate and heat the mixture thus formed for at least about 30 minutes, discontinuing agitation and heating, and allowing the mixture to settle into separate oil and water layers.

7. The process of breaking stable oil-water emulsions containing a relatively large proportion of inorganic salts, said process comprising heating and agitating the emulsion, adding thereto spent refinery caustic solution which has been pretreated by simultaneously blowing steam and air therethrough for several hours at a temperature of above about 160° F., and which has a gravity between about 2° Bé. and 10° Bé. prior to pretreating, and continuing to agitate and heat the mixture thus formed until the emulsion will break into separate oil and water phases after a short settling period, discontinuing agitation and heating, and allowing the mixture to settle into separate oil and water layers.

8. The process of breaking stable oil-water emulsions containing a relatively large proportion of inorganic salts, said process comprising agitating and heating the emulsion until a temperature of about 150° F.–210° F. is reached, adding thereto at least 2 per cent by volume of a spent refinery caustic solution which has been pretreated by simultaneously blowing steam and air therethrough at a temperature above about 160° F. for more than about three hours, and which has a gravity between about 2° Bé. and about 10° Bé. prior to pretreating, continuing to agitate and heat the mixture thus formed for at least about 30 minutes, discontinuing agitation and heating, and allowing the mixture to settle into separate oil and water layers.

9. The process of breaking stable oil-water emulsions containing a relatively large proportion of inorganic salts, said process comprising agitating and heating the emulsion to a temperature of about 200° F., adding thereto between about 2 per cent and about 10 per cent by volume of a spent refinery caustic solution which has been pretreated by simultaneously blowing steam and air therethrough at a temperature of about 200° F. for about five hours and which has a gravity between about 8° Bé. and about 10° Bé. prior to pretreating, continuing to agitate and heat the mixture thus formed for at least about 30 minutes, discontinuing agitation and heating and allowing the mixture to settle into separate oil and water layers.

10. The process of breaking stable oil-water emulsions containing a relatively large proportion of inorganic salts, said process comprising heating the emulsion, adding thereto spent refinery caustic solution which has been pretreated by simultaneously blowing steam and air therethrough for several hours at a temperature of above about 160° F., agitating and heating the mixture thus formed until the emulsion will break into separate oil and water phases after a short settling period, discontinuing agitation and heating, and allowing the mixture to settle into separate oil and water layers.

ARTHUR E. CATANACH.
RALPH P. GULLEY.

REFERENCES CITED

The following references are of record in the file of this patent:

UNITED STATES PATENTS

| Number | Name | Date |
|---|---|---|
| 1,726,309 | Payne et al. | Aug. 27, 1929 |
| 1,726,310 | Payne et al. | Aug. 27, 1929 |
| 1,860,248 | Hyman et al. | May 24, 1932 |
| 2,014,936 | Hendrey et al. | Sept. 17, 1935 |
| 2,539,478 | Roberson | Jan. 30, 1951 |